United States Patent

Krawczyk et al.

[11] Patent Number: 4,650,340

[45] Date of Patent: Mar. 17, 1987

[54] ROTATING DRUM END SEAL

[75] Inventors: Paul D. Krawczyk, Westfield, Mass.; Alexander Bosso, Broad Brook, Conn.

[73] Assignee: Combustion Engineering, Inc., Windsor, Conn.

[21] Appl. No.: 793,942

[22] Filed: Nov. 1, 1985

[51] Int. Cl.⁴ ............................................. B01F 9/00
[52] U.S. Cl. ....................................... 366/220; 277/34; 277/189; 366/150
[58] Field of Search ............... 366/180, 150, 181, 183, 366/220, 232, 233, 234, 235, 236, 54, 185, 175, 62, 63, 44; 277/34, 34.3, 189, 148, 149, 150, 181, 182–184, 142, 143

[56] References Cited

U.S. PATENT DOCUMENTS

| | | | |
|---|---|---|---|
| 132,024 | 10/1872 | Richards | 277/149 |
| 645,224 | 3/1900 | Boehling | 277/148 |
| 2,281,820 | 5/1942 | Ball | 366/54 |
| 2,567,729 | 9/1951 | Rockburg | 366/54 |
| 2,752,175 | 6/1956 | Fletcher | 277/34 |
| 3,752,445 | 8/1973 | Nowak | 366/185 |
| 4,047,742 | 9/1977 | Haferkamp | 277/149 |
| 4,086,806 | 5/1978 | Covey | 277/34 |

Primary Examiner—Robert W. Jenkins
Attorney, Agent, or Firm—Arthur E. Fournier, Jr.

[57] ABSTRACT

Apparatus for sealing an opening (12) in the end face (13) of a rotating drum (10), including a stationary backing plate (24), annular seal ring (20), surrounding the opening and extending in a sealing manner between the backing plate and the end face, resilient means (30 or 52) biasing the sealing ring into contact with the end face, and adjustable means (36 or 56, 58) for varying the force exerted by the resilient means.

4 Claims, 4 Drawing Figures

ROTATING DRUM END SEAL

BACKGROUND OF THE INVENTION

Many industries presently make use of rotating drums for treating various materials. For example, at a coal fired steam generating plant, the ash discharged from a furnace is often treated in a rotating drum. One problem encountered in such an installation is forming an effective seal around the stationary inlet duct for the rotating drum. Existing seals for this application frequently leak after a short period of operation due to wear or the inability of the seal to follow the rotating surface. If the material being treated is at a high temperature, as ash may be, it can add to the problem by causing warpage or uneven thermal expansion of the various pieces of equipment. Leakage of hot, abrasive material, such as ash, into the atmosphere, can cause damage to the other machine parts and also is environmentally hazardous.

SUMMARY OF THE INVENTION

In accordance with the invention, a seal is provided for preventing leakage around the area adjacent the stationary inlet duct for a rotating drum which is of low friction material, capable of withstanding relatively high temperature, is long wearing, and self-compensating for seal wear, or out-of-alignment conditions of the rotating drum. The seal consists of a stationary ring completely surrounding the opening in the rotating drum, which ring is resiliently biased into contact with the drum. The force with which the ring is biased is adjustable so that a desired force can initially be applied and can later be adjusted to compensate for ring wear, drum wobble, or other factors influencing the seal effectiveness.

DESCRIPTION OF THE PREFERRED EMBODIMENT

Figure 1:
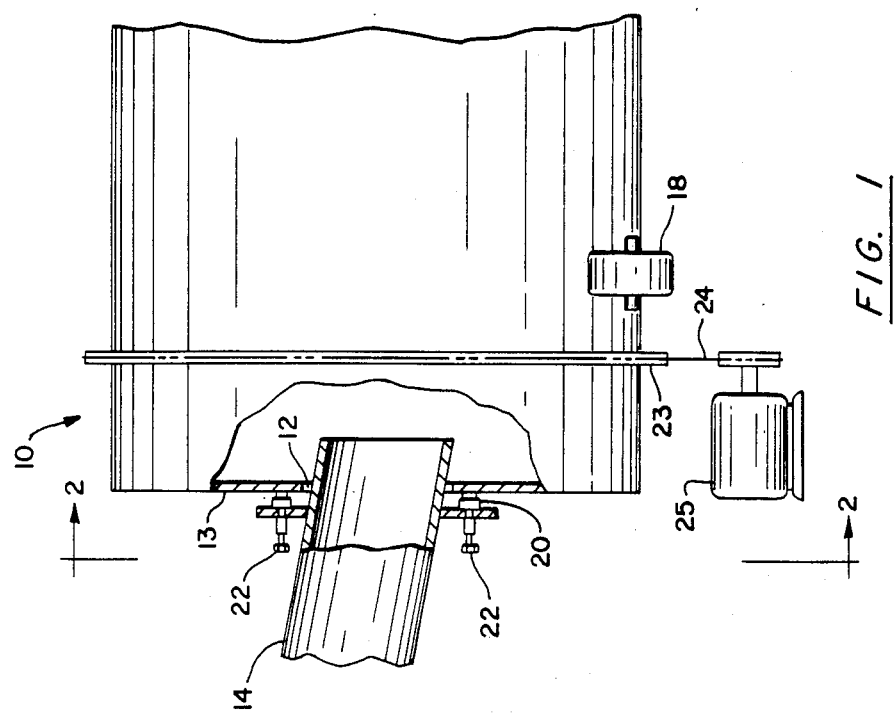
FIG. 1 is a partial sectional side view of a rotary drum.
Figure 2:
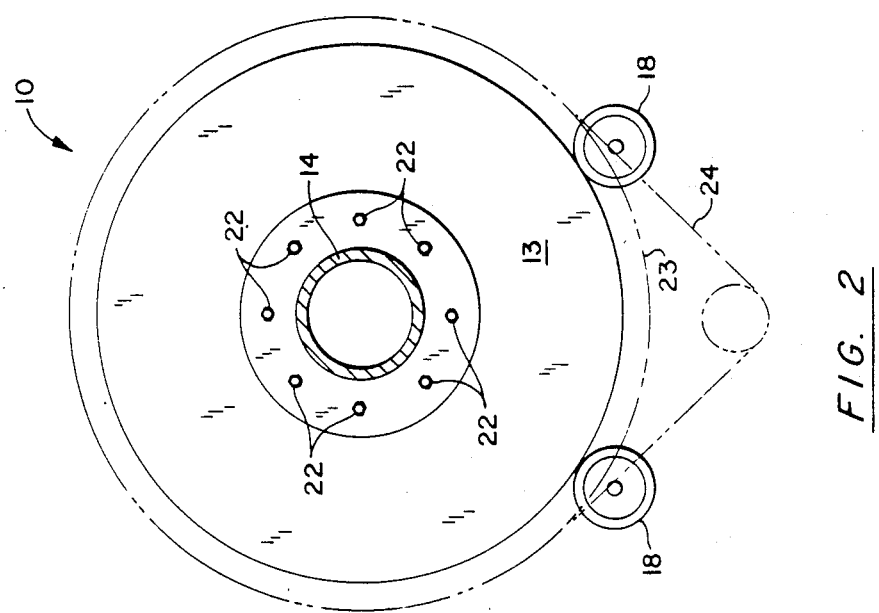
FIG. 2 is a view taken on line 2—2 of FIG. 1.

Looking now to FIGS. 1 and 2 of the drawings, numeral 10 designates a rotary drum having an opening 12 in the front end 13 thereof. Extending into the opening is a duct 14 by means of which material to be treated is introduced into the drum. One such material could be hot ashes from a coal fired furnace. The drum is driven by a motor 25 through a chain 24 and sprocket assembly 23. The duct 14 is stationary and does not rotate with the drum. In order to prevent dust from escaping from the drum during operation, an end seal 20 is provided which completely surrounds the opening 12. The seal is biased into contact with the front end 13 of the drum by a plurality of members 22, eight of them being shown in FIG. 2. The members 22 are equidistantly spaced around the entire circumference of the sealing ring, and are supported by backplate 24 which is secured to the duct 14.

Figure 3:
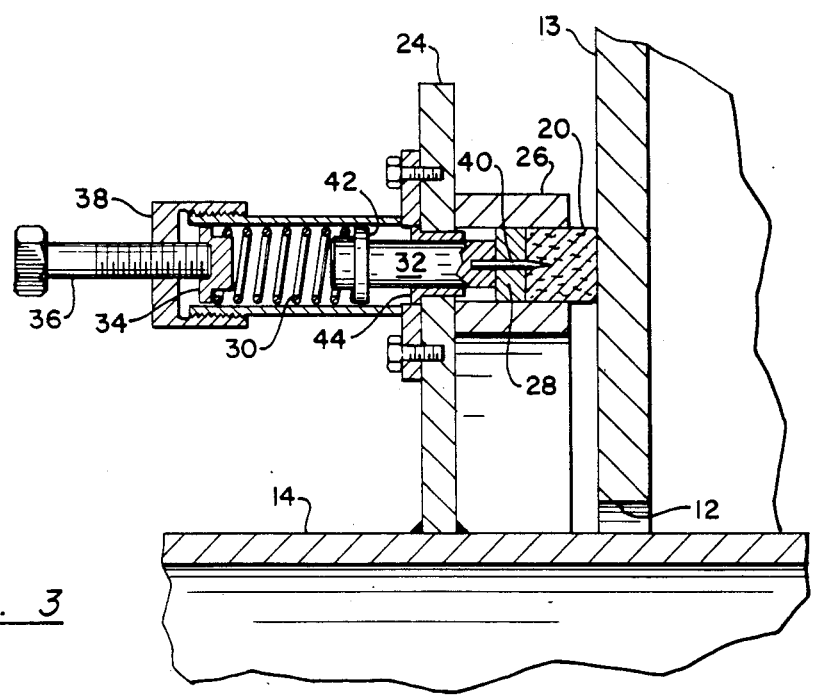
FIG. 3 is an enlarged sectional view of the end seal of the invention.

Looking now to FIG. 3, the end seal will be explained in more detail. The seal ring 20 completely surrounds the opening 12 in the drum end 13. The ring is preferably circular, although it may be of any figuration, the only important feature being that it completely surround the opening 12, so as to prevent leakage therefrom. The ring 20 is fitted in an annular housing 26. A backing ring 28 is positioned within the housing also. This ring 28 is also circular and extends through 360 degrees in segments. Positioned 45 degrees apart (FIG. 2) are eight spring biasing assemblies which force the rings 28 and 20 towards the drum end 13. Each assembly includes a spring 30 which abuts against a plunger 32 at its forward end and rests on a spring seat at its other end. The spring force is adjustable by means of bolt 36 which is threaded into the end cap 38. A pin 40, which extends through a suitable opening in ring 28 and then also extends into sealing ring 20 a short distance, prevents the ring 20 from rotating with the drum. Rotation of the ring 20 could cause wear on its sidewalls, or cause it to become twisted or displaced from the annular housing 26, breaking the seal. A stop surface 42 on plunger 32, when it contacts surface 44, prevents movement of the seal to the point where pin 40 would be contacting end wall 13. When surfaces 32 and 44 make contact, it is time to install a new sealing ring 20. When the seal ring has worn some, for example 25–50 percent, the springs can be readjusted so as to exert the same force as they did initially, thus compensating for the wear of the ring. This adjustment can be made during a normal maintenance shutdown, or while the unit is in operation if desirable.

From the above, it can be seen that the seal is simple to initially install, adjust after wear, or replace. The backing ring 28 distributes the spring loading evenly around the seal ring 20. The ring 20 can compensate for some wobble or misalignment of the rotating drum. The floating seal arrangement adjusts the seal to the drum to compensate for seal wear. Any suitable sealing or packing material can be used for the ring 20. For example, it can be made of graphite, teflon, asbestos, or even metal.

Figure 4:
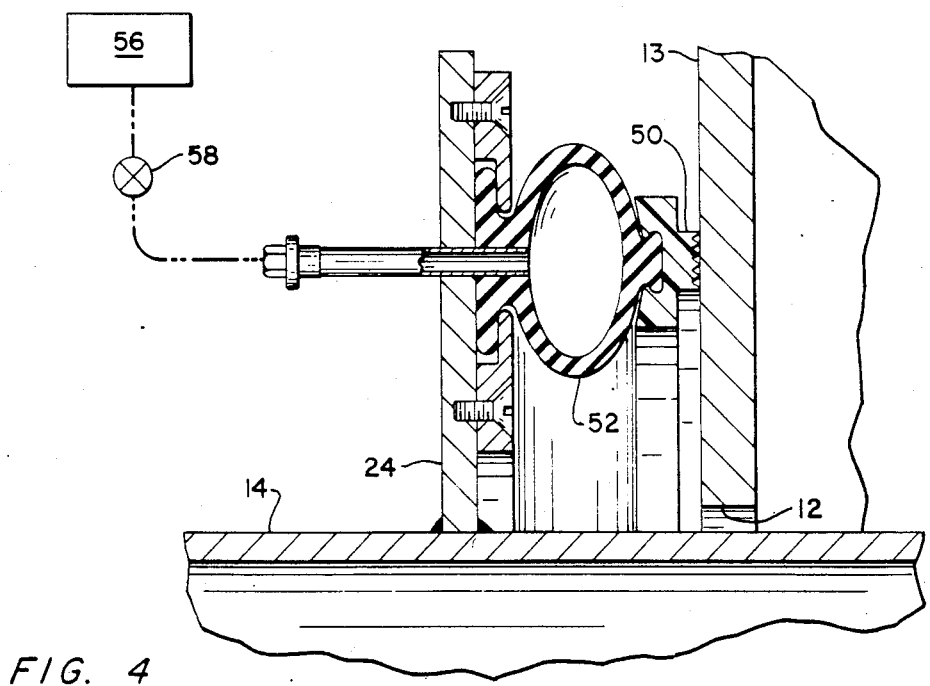
FIG. 4 is a sectional view of an alternative end seal of the invention.

FIG. 4 shows an alternative arrangement of a seal which eliminates the need for a plurality of springs. A circular sealing ring 50 is biased into contact with the drum face 13 by means of an air filled circular or donut-shaped member 52, secured to the plate 24. The air pressure can be varied by connecting connection 54 to a pressure source 56 through valve 58.

We claim:

1. In combination, a drum having a longitudinal axis, means for rotating the drum about its longitudinal axis, an end wall on one end of the drum, opening means in the end wall, a stationary duct extending into the opening means, an end seal for sealing the opening means, said end seal including plate means surrounding the duct and extending substantially parallel to the end wall, an annular seal ring surrounding the opening means, and extending in a sealing manner between the plate means and the end wall, resilient means biasing the seal ring into contact with the end wall, and adjustable means for varying the force with which the resilient means biases the seal ring into contact with the end wall.

2. The combination set forth in claim 1, including means for preventing rotation of the seal ring with the drum.

3. The combination set forth in claim 1, wherein the resilient means is a plurality of springs.

4. The combination set forth in claim 1, wherein the resilient means is a fluid-filled, donut-shaped resilient member.

* * * * *